US008390618B2

(12) United States Patent
Reshetov

(10) Patent No.: US 8,390,618 B2
(45) Date of Patent: Mar. 5, 2013

(54) TECHNIQUE FOR IMPROVING RAY TRACING PERFORMANCE

(75) Inventor: Alexander Reshetov, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 1176 days.

(21) Appl. No.: 12/041,229

(22) Filed: Mar. 3, 2008

(65) Prior Publication Data

US 2009/0219285 A1    Sep. 3, 2009

(51) Int. Cl.
*G06T 15/00* (2011.01)
(52) U.S. Cl. ........ 345/420; 345/419; 345/421; 345/424; 345/426; 345/522; 345/555; 345/589; 715/16; 715/201; 715/246; 715/764
(58) Field of Classification Search .................. 345/419, 345/420, 421, 424, 426, 522, 555, 589; 715/16, 715/201, 246, 764
See application file for complete search history.

(56) References Cited

U.S. PATENT DOCUMENTS

| | | | | |
|---|---|---|---|---|
| 7,495,664 | B2* | 2/2009 | Keller et al. | 345/426 |
| 7,659,894 | B2* | 2/2010 | Keller et al. | 345/426 |
| 7,952,583 | B2* | 5/2011 | Waechter et al. | 345/426 |
| 2008/0043018 | A1* | 2/2008 | Keller et al. | 345/426 |
| 2009/0213115 | A1* | 8/2009 | Keller et al. | 345/419 |
| 2009/0256845 | A1* | 10/2009 | Sevastianov et al. | 345/426 |
| 2010/0194751 | A1* | 8/2010 | Wald et al. | 345/426 |

OTHER PUBLICATIONS

Wald et al. "Ray Tracing Deformable Scenes Using Dynamic Bounding Volume Hierarchies", ACM Jan. 2007.*

* cited by examiner

*Primary Examiner* — Kimbinh T Nguyen
(74) *Attorney, Agent, or Firm* — Trop, Pruner & Hu, P.C.

(57) ABSTRACT

A technique to improve ray tracing performance. In one embodiment, polygons not intersecting a specially created frustum are excluded from further ray-triangle tests, thereby enabling more efficient traversal of an acceleration structure corresponding to the given scene.

22 Claims, 5 Drawing Sheets

510

520

TECHNIQUE FOR IMPROVING RAY TRACING PERFORMANCE

FIELD OF THE INVENTION

Embodiments of the invention relate generally to the field of computer graphics. More particularly, embodiments of the invention relate to techniques to perform ray tracing within a computer system.

BACKGROUND

Ray tracing is a technique that involves finding intersections of given rays with geometric objects in a scene. Ray tracing can be used to create a more pleasing and rich 3D experience compared with traditional rasterization approaches, as it approximates natural light propagation more accurately.

Because ray tracing may involve many ray-polygon intersection tests, some additional structures, known as "acceleration structures", may be used to minimize the number of ray/polygon intersection tests. Acceleration structures may include linked data arrays containing information about the geometric detail in a 3D scene (e.g., bounding box coordinates), which enables a ray trajectory to be traced through a scene in a more logarithmic amount of time compared to the amount of time necessary to test every ray against every polygon within a scene or object in a scene. There are many types of acceleration structures, including "kd-tree" acceleration structures, which contain "nodes" representing 3D space divided into two sub-spaces by a split plane. In a kd-tree, the leaf nodes of the tree contain polygons intersecting the bounding box of the leaf node. Typically, in an acceleration structure, such as a kd-tree, larger bounding boxes are represented at the highest level of the hierarchy and progressively smaller bounding boxes are at the bottom of the structure.

Creating acceleration structures, such as kd-trees, can be computationally expensive. Smaller acceleration structures are faster to create, but they eliminate fewer ray-polygon intersection tests. The optimal size of the acceleration structure is dependent on how fast it could be traversed compared with the average speed of the used ray-triangle intersection test.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Embodiments of the invention may be used in computer systems in which graphics rendering hardware is implemented. Furthermore, embodiments may be used in computer systems or microprocessors in which general purpose central processing units (CPU) are implemented. Moreover, some embodiments may be used in systems or processors in which both graphics processing and general purpose CPU processing are performed by the same or different hardware. In yet further embodiments, operations described herein may be implemented in software, hardware, or some combination thereof.

In some embodiments, the speed of the traversal of acceleration structures used in the ray tracing algorithms may be improved by techniques described herein. In one embodiment, techniques described herein shorten search trees within the acceleration structure by increasing the size of sub-nodes (or "leaf nodes") to be traversed, thereby reducing the computations necessary to calculate the proper information contained within the acceleration structure as a 3D graphics scene is rendered using ray tracing techniques, and thereby increasing the performance of a 3D graphics application.

In one embodiment, in which a 3D scene represented in an acceleration structure, such as a kd-tree, for example, the number of polygons to be tested is decreased by determining which polygons do not fall within a sub-space (or "frustum") formed by group of rays. A frustum can be conceptualized as the 3D shape bounded by the intersection of three or more (e.g., 4) planes in a 3D space. By determining which polygons intersect a frustum during traversing the leaf nodes of an acceleration structure, and using the corresponding polygons for ray-polygon tests, significant portion of processing can be avoided, because only the polygons intersecting the frustum are tested.

Figure 1:
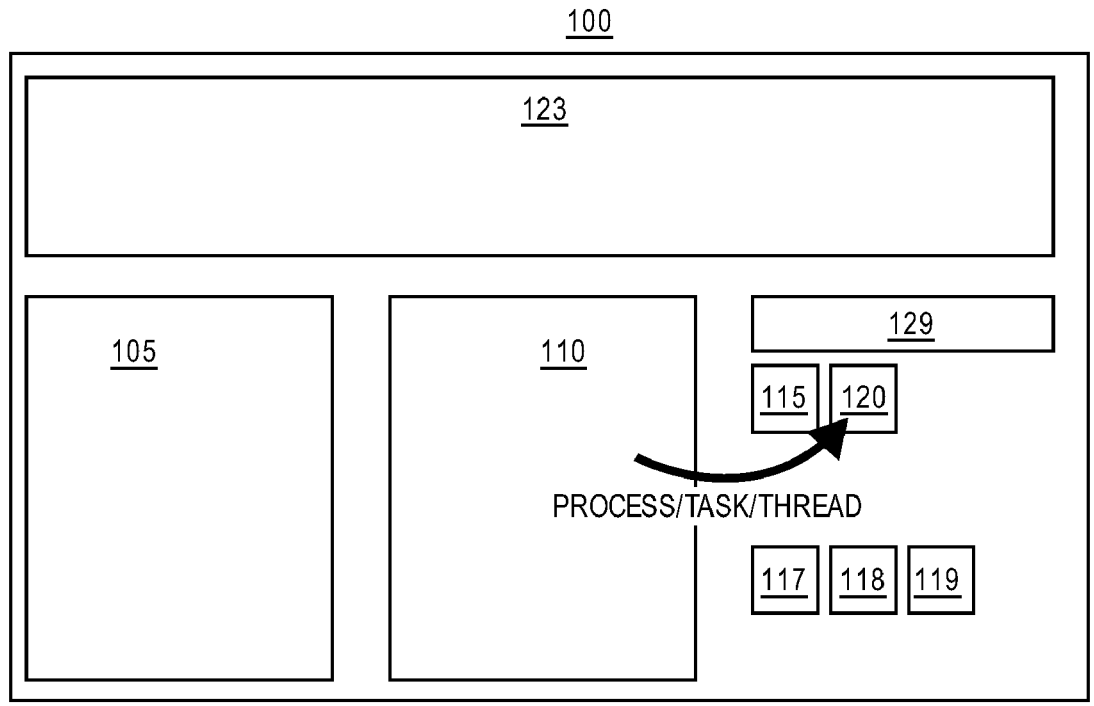
FIG. 1 illustrates a block diagram of a processor, in which at least one embodiment of the invention may be used.

FIG. 1 illustrates a processor in which at least one embodiment of the invention may be used. In particular, FIG. 1 illustrates processor 100 having one or more central processing units (CPUs) 105 and 110 and at least one non-CPU functional unit 107 and 113, respectively. Also illustrated in FIG. 1 is at least one other non-CPU functional unit 115 which may perform other operations not performed by functional units 107 and 113. In one embodiment, the functional units 107, 113, and 115 may include functions such as graphics processing, memory control and peripheral control, such as audio, video, disk control, digital signal processing, etc. In some embodiments, processor 100 may also include other logic not shown in FIG. 1, such as I/O control. In one embodiment, each processor in a multi-processor system or each processor core in a multi-core processor may include or otherwise be associated with logic 119 to enable techniques to improve speed of ray tracing acceleration structure traversal and corresponding polygon rendering, in accordance with at least one embodiment. In one embodiment, the processor 100 is a graphics processor and the logic 119 is used to help determine which polygons lay outside a frustum defined by rays passing through a given bounding box. In other embodiments, the logic 119 may include software to help determine which polygon vertices are within or outside of a frustum. In other embodiments, the logic 119 may include both hardware and software to help determine polygons intersected by or contained within a frustum.

In some embodiments, the processor 100 may be a general purpose CPU. In other embodiments, the processor may be either a general purpose CPU or hardware that can perform graphics-specific functions within a system that may include both general purpose CPU integrated circuits as well as graphics-specific hardware or other parallel computational hardware. As general purpose computing becomes more integrated with parallel computational hardware, such as graphics engines, texture samples, etc., the more versatile and location-independent the logic 119 becomes. As a result, logic 119 could include hardware/software or any combination thereof and be located or integrated within or outside of any portion of the processor 100.

In one embodiment, logic 119 includes logic for performing graphics rasterization clip functions. Furthermore, in one embodiment, the logic includes arithmetic logic units (ALUs) found within or associated with single-instruction-multiple-data (SIMD) execution logic. Because embodiments of the invention perform comparative analysis between polygons within and outside of a frustum, operations associated with an embodiment lend themselves to be performed by parallel instruction set architectures (ISAs) and micro-architectures. However, traditional single-instruction-single data architectures/micro-architectures are also suitable for performing embodiments of the invention. In one embodiment, the logic units of processor 100 may be interconnected over a ring interconnect, shared-bus interconnect (e.g., front-side bus), point-to-point (P2P) interconnect, or other interconnect structure.

Figure 2:
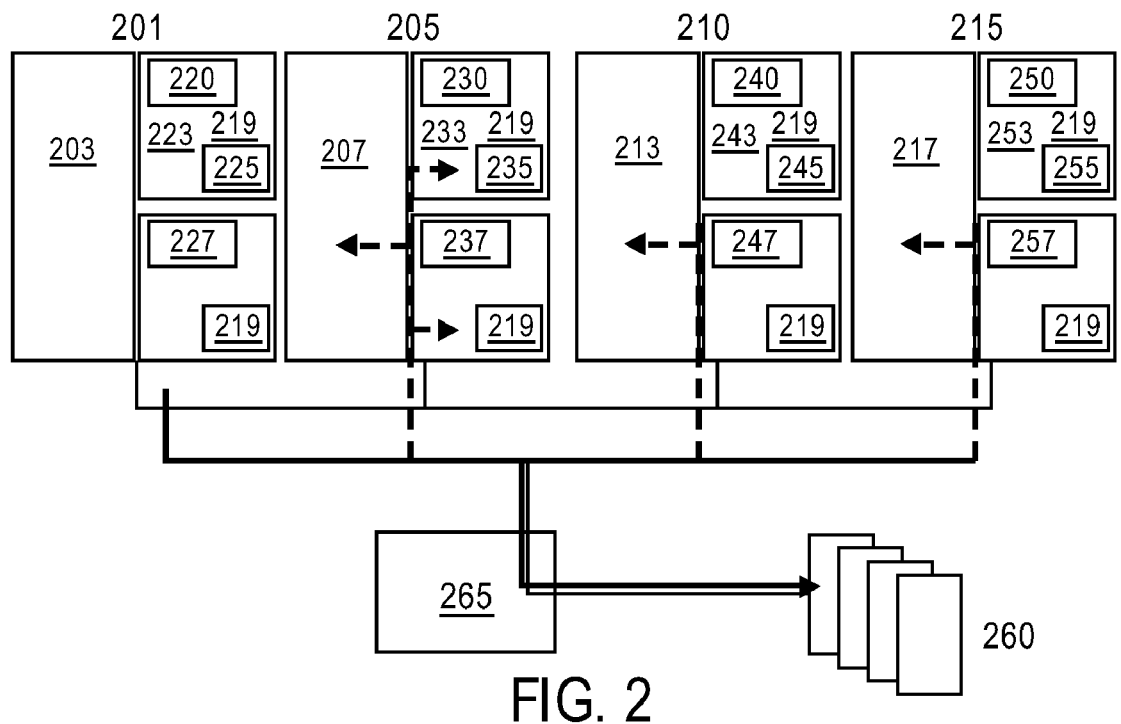
FIG. 2 illustrates a block diagram of a shared bus computer system, in which at least one embodiment of the invention may be used.

FIG. 2 illustrates a shared-bus computer system in which one embodiment of the invention may be used. Microprocessors 201-215 may contain various functional units, such as one or more CPUs (223, 227, 233, 237, 243, 247, 253, 257), graphics device (207, 217, 227, 237), memory controller (225, 235, 245, 255), I/O control, or other functional units, such as a PCI or PCIe controller (220, 230, 240, 250). The system of FIG. 2 may also include an I/O controller 265 to interface the microprocessors to peripheral control devices 260.

In one embodiment, the system includes 3D graphics logic, such as a rendering engine, texture sampler, etc., which may include logic to perform at least one embodiment of the invention. Furthermore, in other embodiments, a peripheral control device may include a graphics device to perform embodiments of the invention. Any CPU in the system may also include logic to perform operations associated with embodiments of the invention. In one embodiment, one or more microprocessors of FIG. 2 may include a general purpose processor, graphics processor, or some other type of processor having logic 219 to determine which polygons land within and/or outside of a frustum formed by intersection of given rays and a bounding box of a given node within an acceleration structure, such as a kd-tree.

In some embodiments, some or all of the elements illustrated in FIG. 2 may be included in a microprocessor and include other interconnects, such as direct memory interface (DMI), a PCI express graphics (PEG) interconnect, etc. Regardless of configuration, embodiments of the invention may be included or otherwise associated with any portion of the system of FIG. 2.

The system of FIG. 2 may also include main memory (not shown), which may be include various memory structures, such as dynamic random-access memory (DRAM), a hard disk drive (HDD), or a memory source located remotely from the computer system via network interface containing various storage devices and technologies. Cache memory within the system of FIG. 2 may be located either within a processor or in close proximity to a processor, such as on the processor's local bus.

Furthermore, the cache memory may contain relatively fast memory cells, such as a six-transistor (6T) cell, or other memory cell of approximately equal or faster access speed.

Figure 3:
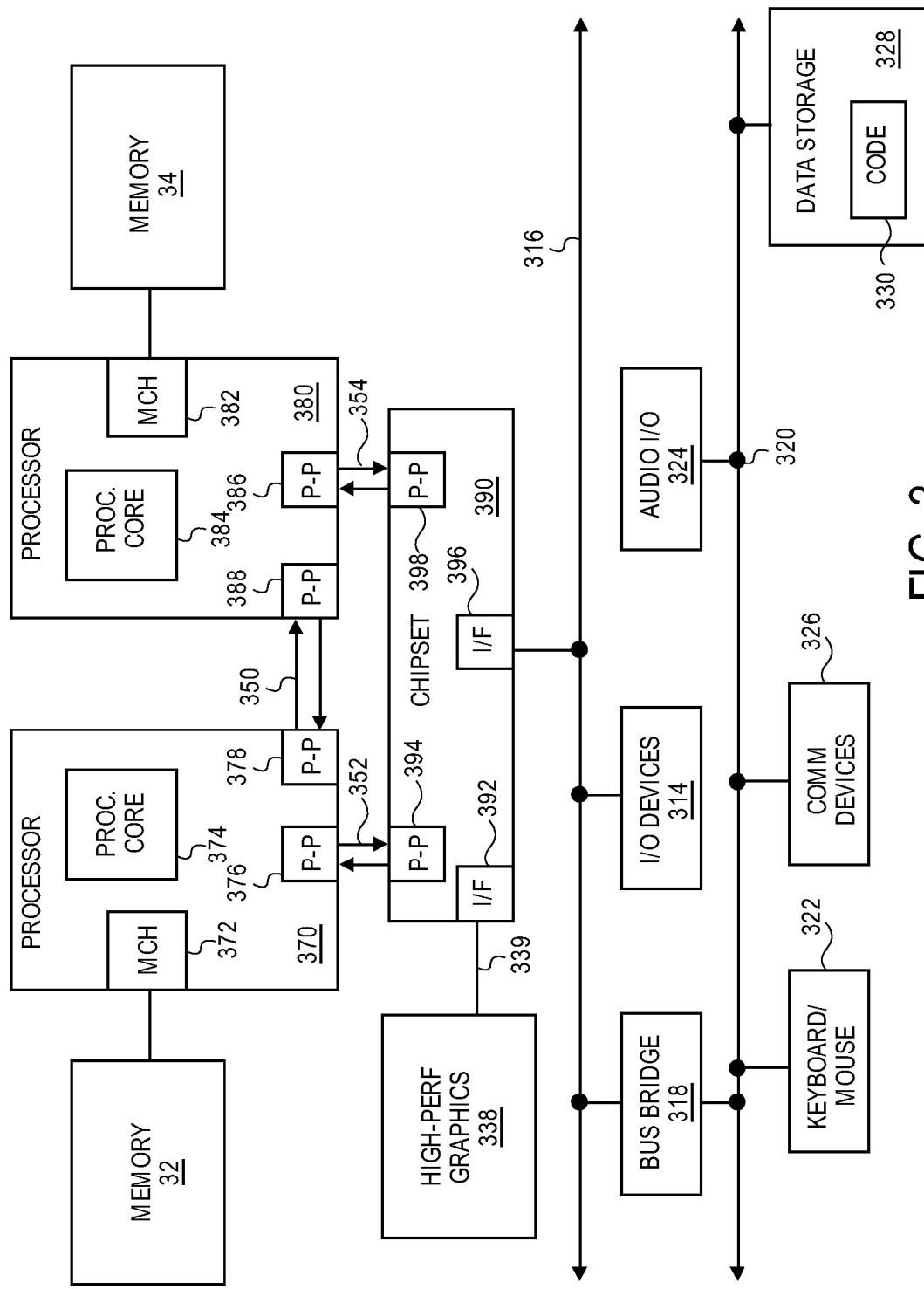
FIG. 3 illustrates a block diagram a point-to-point interconnect computer system, in which at least one embodiment of the invention may be used.

In addition to the shared-bus computer system illustrated in FIG. 2, other system configurations may be used in conjunction with various embodiments of the invention, including point-to-point (P2P) interconnect systems and ring interconnect systems. The P2P system of FIG. 3, for example, may include several processors, of which only two, processors 370, 380 are shown by example. Processors 370, 380 may each include a local memory controller hub (MCH) 372, 382 to connect with memory 32, 34. Processors 370, 380 may exchange data via a point-to-point (PtP) interface 350 using PtP interface circuits 378, 388. Processors 370, 380 may each exchange data with a chipset 390 via individual PtP interfaces 352, 354 using point to point interface circuits 376, 394, 386, 398. Chipset 390 may also exchange data with a high-performance graphics circuit 338 via a high-performance graphics interface 339. Embodiments of the invention may be located within any processor having any number of processing cores, or within each of the PtP bus agents of FIG. 3. In one embodiment, logic 319 may be used to perform operations associated with at least one embodiment of the invention.

Figure 4:
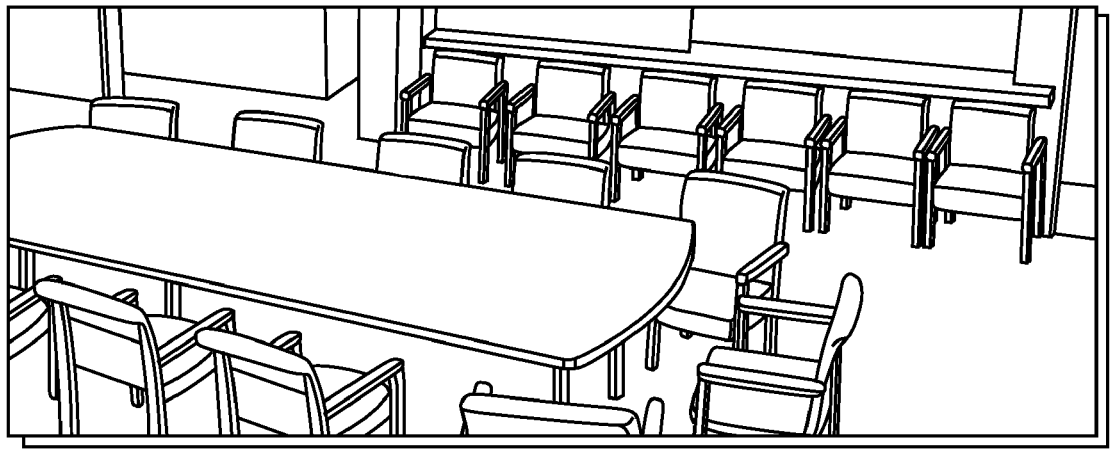
FIG. 4 illustrates a three-dimensional (3D) image to be rendered according to at least one embodiment.

FIG. 4 illustrates an image that may be rendered according to one embodiment, using global illumination technique. Multiple rays per pixel have to be traced to achieve this image quality.

Figure 5:
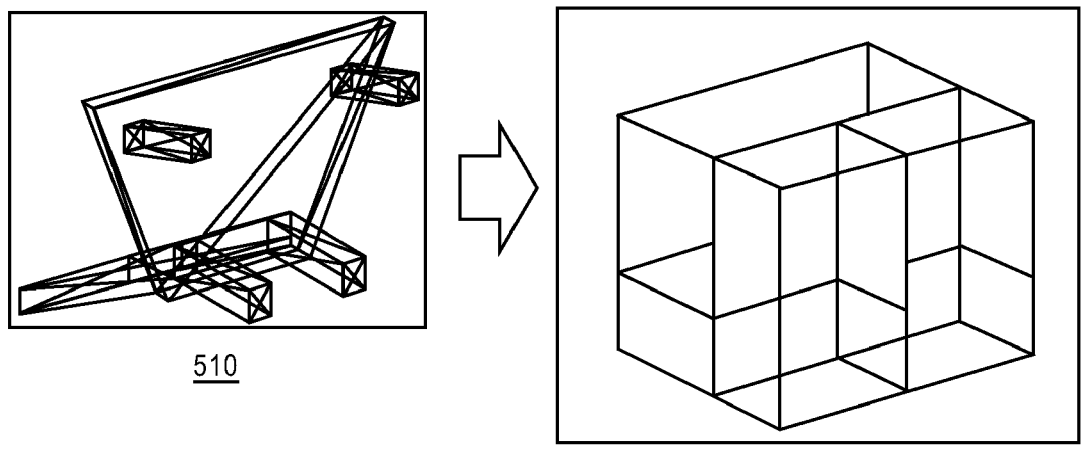
FIG. 5 illustrates an acceleration structure, which may be used in conjunction with one embodiment.
Figure 5:
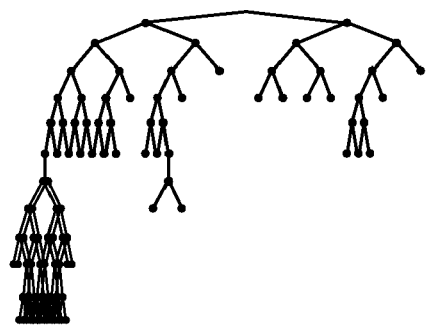

FIG. 5 illustrates an acceleration structure that may be used with at least one embodiment of the invention. The acceleration structure of FIG. 5 is a kd-tree 501, the top-level node of which corresponds to the largest bounding box of a scene, such as the one in FIG. 510. The lower-level nodes of the kd-tree correspond to progressively smaller bounding boxes of FIG. 520. Each internal node in FIG. 501 has two children at lower level in the tree. The acceleration structure of FIG. 5 could be quite large depending on the number of polygons in the scene. Therefore, the time and computing resources required to build the acceleration structure may be quite significant.

In one embodiment, a frustum is formed for each of leaf nodes through which packet of rays pass. Embodiments of the invention reduce the amount of processing necessary to traverse the acceleration structure and render the image by first determining what polygons need to be tested (i.e., those intersected by the frustum) and which do not (i.e., those within a leaf node that are not intersected by the frustum) and then processing only those polygons intersected by the frustum.

Figure 6A:
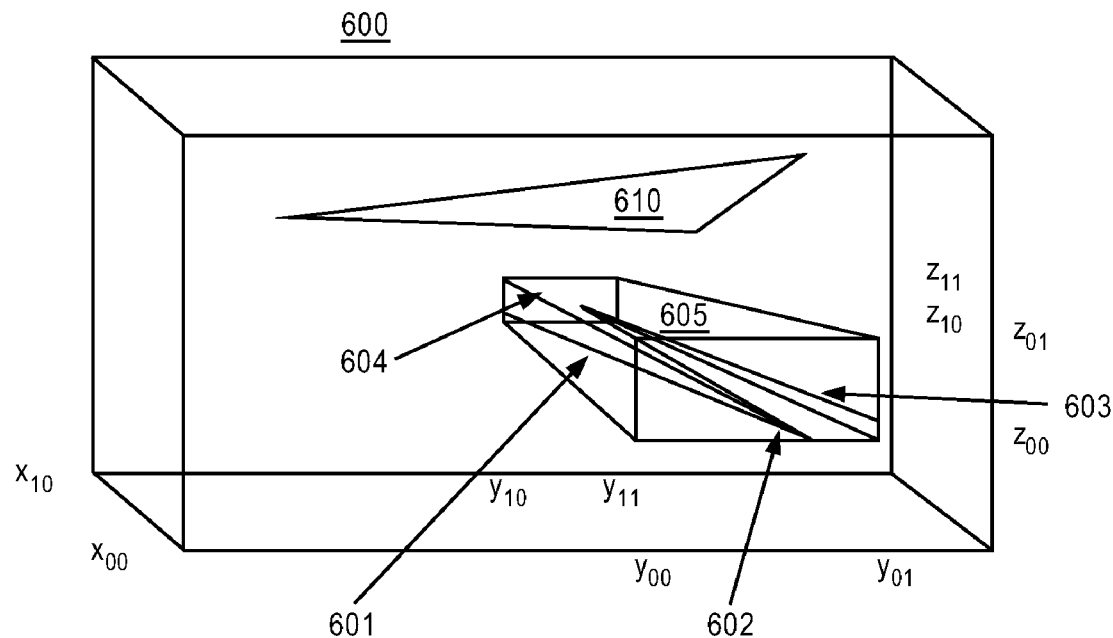
FIG. 6 illustrates a bounding box being intersected by a frustum and a polygon lying outside the frustum, which may be culled according to one embodiment.
Figure 6B:
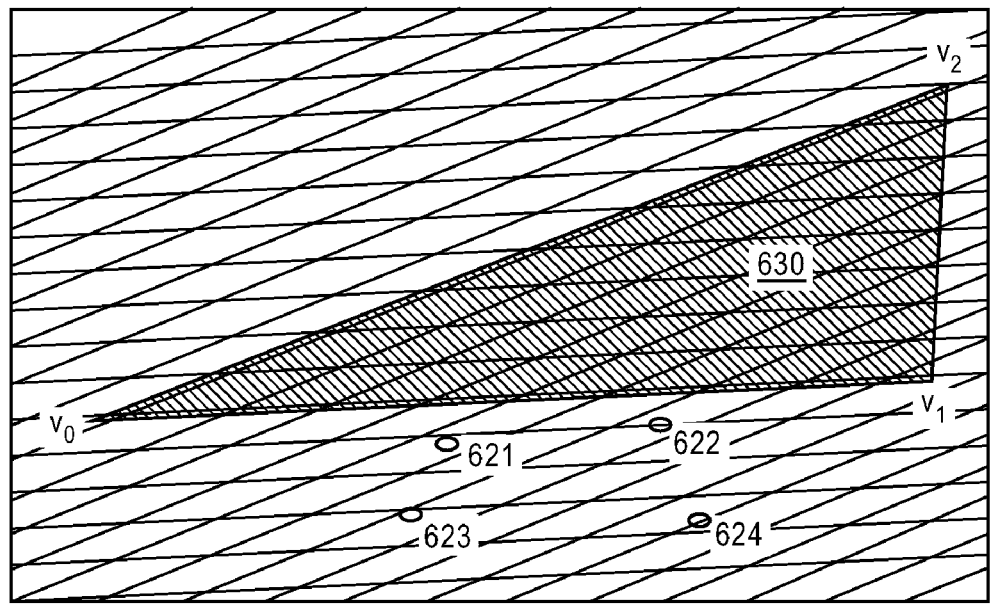

FIG. 6 illustrates a bounding box being intersected by a frustum, wherein at least one embodiment of the invention may be used to determine the polygons that can be ignored and which polygons must be tested and possibly rendered. In FIG. 6, the bounding box 600 is intersected by frustum 605, which contains rays 601, 602, 603, and 604. In other embodiments more or fewer rays may define the frustum. Also illustrated is a triangle 610, which lies outside of the frustum (i.e., is not intersected by the frustum). Triangle 610 need not be tested, and therefore excluded from the processing for the given packet. Instead, triangle 610 is ignored, in one embodiment, by performing a culling function to exclude the ray-triangle intersection tests for a given packet while traversing the leaf node housing the triangle.

In one embodiment, the culling is also performed in a plane 620 of a triangle 630 by finding an intersection of a frustum with the plane 620. The intersection of frustum 605 with the plane 620 is defined by points 621, 622, 623, and 624. In one embodiment, by comparing the coordinates of the vertices of triangle 630 with the coordinates of these four points it is possible to detect if triangle lays completely outside of the frustum.

Figure 7:
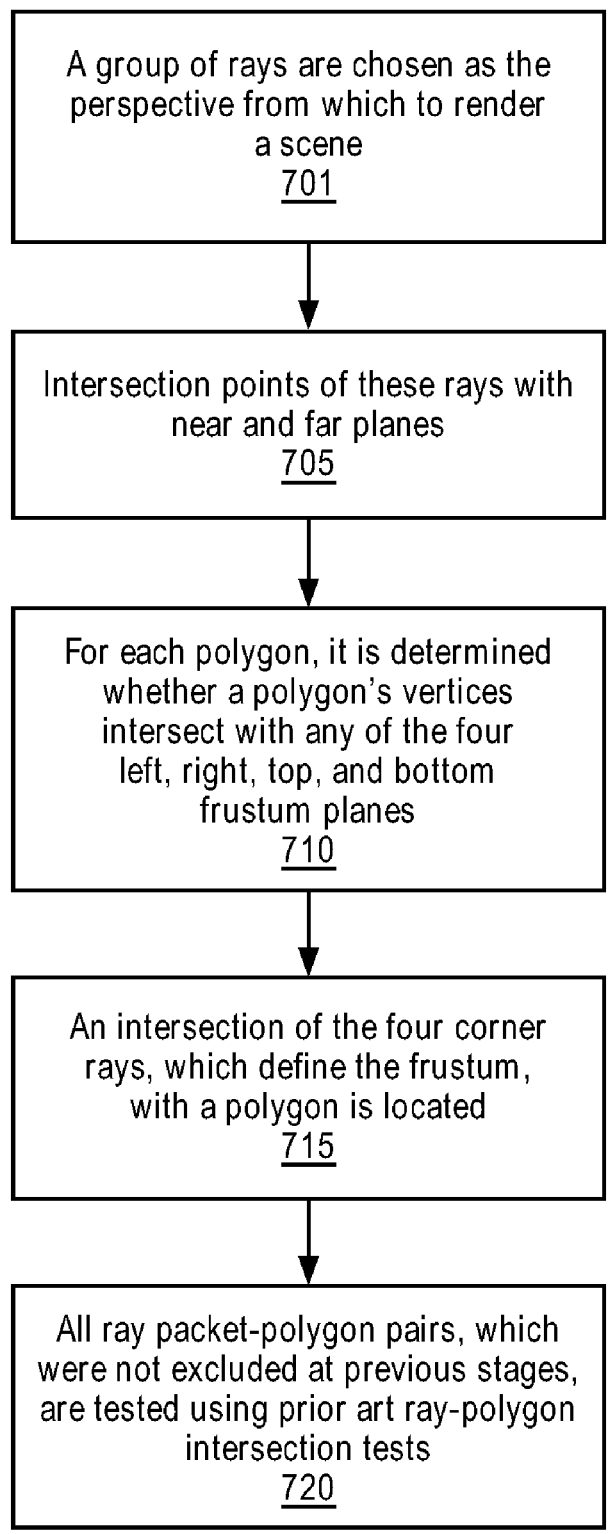
FIG. 7 is a flow diagram illustrating operations that may be used in one embodiment.

FIG. 7 illustrates a flow diagram of operations that may be used in conjunction with at least one embodiment of the invention, to find all intersections of a packet of rays with polygons (e.g., triangles) inside a leaf node regardless of the processor or system configuration in which the embodiment is used. At operation 701, a group of rays are chosen during rending of a scene. At operation 705, the intersection points of these rays with near and far planes ($x=x_{00}$ and $x=x_{10}$ planes of FIG. 6) of the bounding box of traversed node are found and the axis-aligned rectangles containing these intersections for each plane are calculated. The resulting rectangles, bounding the rays passing through the bounding box, form a frustum containing the intersections of the rays with the node's boundaries.

At operation 710, for each polygon, it is determined whether polygon's vertices lays outside of any of the four left, right, top, and bottom frustum planes. If all polygon vertices are outside at least one plane, this polygon is excluded from further processing. Otherwise, at operation 715, an intersection of the four corner rays, which define the frustum, with a polygon plane is computed. Using the coordinates (e.g., barycentric coordinates) of intersection points between the frustum corner rays and the plane, situations can be identified where the frustum is separated from the polygon by any one of the convex polygon edges. Optionally, two additional frustum planes (near and far) could be inspected at this stage to eliminate polygons which are either behind the point of perspective (near plane) or further away than the previously found intersecting polygon (far plane). At operation 720, all ray packet-polygon pairs, which were not excluded at previous stages, are tested using prior art ray-polygon intersection tests. In other embodiments other methods may be used to find polygon intersection points with the ray packet or frustum.

In one embodiment, finding the intersection of a ray and a triangle is equivalent to solving a linear system of three equations represented by $$o+td=p_0+u(p_1-p_0)+v(p_2-p_0) \quad (1)$$

with additional requirements:

$$0 \leq t \leq t_{old} \quad (2)$$

$$0 \leq u, 0 \leq v, u+v \leq 1 \quad (3)$$

The left side of the system defines a ray with the origin 'o' and the direction 'd', whereas the right side of the system defines points inside a triangle with vertices '$p_0$', '$p_1$', and '$p_2$'. In the above system, 't' is a variable representing a distance to the ray/triangle intersection point from the ray's origin 'o', and barycentric coordinates, 'u' and 'v', of the point inside the triangle. A requirement (1) of the system described above is that the intersection point, $u_1$, $v_1$, be closer to the ray's origin than the previously found intersection point, $u_0, v_0$, (as represented by (2)), and within the triangle's boundaries (as represented by (3)).

In one embodiment, the described algorithm presumes the existence of at least one coordinate for which all directions of rays in a packet have the same sign and uses the coordinate with the largest absolute value. This is a significantly weaker requirement than other acceleration structure traversal algorithms (e.g., all directions of each coordinate have the same sign). If there is no prevalent direction for a packet of rays, prior art splitting techniques may be used, although such ray packets may occur very infrequently (and never for primary rays). In at least one embodiment, choosing the most prevalent axis does not affect the accuracy of computations, but may result in improved performance of the algorithm.

In one embodiment, determining whether all polygon vertices lay outside at least one frustum plane may involve using single-instruction-multiple-data (SIMD) multiplication and addition operations for each polygon vertex. As illustrated on FIG. 6, the bottom frustum plane is defined by three points $[x_{00}, y_{10}, z_{00}]$, $[x_{00}, y_{01}, z_{00}]$, and $[x_{10}, y_{10}, z_{10}]$. Its no the following cross product:

$$n_b=([x_{10},y_{10},z_{10}]-[x_{00},y_{00},z_{00}]) \times ([x_{00},y_{01},z_{00}]-[x_{00},y_{00},z_{00}]),$$

which may be simplified to:

$$n_b=[(y_{01}-y_{00})(z_{00}-z_{10}),0,(x_{00}-x_{10})(y_{00}-y_{01})]$$

Because $[x_{00}, y_{00}, z_{00}]$ lies in the frustum plane, any given vertex, $v=[v_x, v_y, v_z]$, will necessarily lie outside the frustum plane (and therefore the frustum) if the dot product, $n_b \cdot ([v_x, v_y, v_z]-[x_{00}, y_{00}, z_{00}])$ is negative. This relationship may be expanded and simplified to the expression:

$$(y_{01}-y_{00})(v_z(x_{10}-x_{00})+x_{00}z_{10}-x_{10}z_{00}+v_x(z_{00}-z_{10}))$$

Because, in one embodiment, the absolute value of this expression is not necessary, but only its sign, the first multiplier $(y_{01}-y_{00})$ may be ignored, as it is always positive. The above calculations may be repeated for all four frustum planes and represented by 4-component vectors (to facilitate SIMD processing, for example). In one embodiment, this may result in the following algorithm for detecting a separation of polygon's vertices and a frustum:

(1) For each ray packet, compute two SIMD vectors $q_0$ and $q_1$ for each instance the packet traverses a node (bounding box) according to the equations:

$$dx=x_{10}-x_{00}$$

$$q_0=[x_{00}z_{10}-x_{10}z_{00},x_{10}y_{01}-x_{00}y_{11},x_{10}z_{01}-x_{00}z_{11},x_{00}y_{10}-x_{10}y_{00}]/dx$$

$$q_1=[z_{00}-z_{10},y_{11}-y_{01},z_{11}-z_{01},y_{00}-y_{10}]/dx$$

(2) For each vertex $v=[v_x, v_y, v_z]$, the four components of the SIMD variable, the distance, $d=[v_z, -v_y, -v_z, v_y]+[v_x, v_x, v_x, v_x]q_1+q_0$, will be proportional to the distances to the four frustum planes.

(3) If at least one component of the distance is negative for all polygon vertices, the polygon may be considered to be separated from the frustum by the corresponding frustum plane, which can be determined, in one embodiment, using mask extraction operations (e.g., "MOVEMSK").

In one embodiment, $q_0$ and $q_1$ may be divided by dx in the above equation to achieve better memory organization and run-time performance, by reducing the number of the stored terms from three to two. Operations described in reference to FIG. 7 can be performed concurrently with ray packet clipping, in one embodiment. In one embodiment, in which kd-trees are used as the acceleration structure, the techniques described herein may involve storing the coordinates of node's bounding boxes for all non-empty leaf nodes together with other node data. In other embodiments, bounding box coordinates may be determined dynamically, or "on the fly".

In one embodiment, triangles can be excluded whose vertices are separated from the frustum, according to a technique, such as in operation 710 in FIG. 7. While the frustum is being determined, a packet of 4 rays corresponding to the frustum corners may also be determined. If any of the three conditions discussed in reference to operation 710 in FIG. 7 are false for all four rays, then it may determined that the frustum does not intersect the triangle. In one embodiment, if all corner rays do intersect a triangle, then aperture checking could be omitted for all rays in the packet.

In addition to four frustum planes, embodiments could further eliminate unnecessary tests by considering near and far frustum planes. Near plane is orthogonal to the prevalent axis of the ray packet and passes through the ray's origin with the smallest prevalent coordinate value for rays with positive direction along the prevalent axis and the largest coordinate for negative directions. The intersections of four corner frustum rays with such plane can be used to purge triangles that are strictly behind the beam of rays. Similarly, if all four frustum corner rays intersect one triangle, the computed distances could be used to purge all triangles behind the one triangle, in one embodiment. In some embodiments, the effectiveness of clipping in relation to the far plane may depend on the size of triangles in a scene.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor.

Thus, a method and apparatus for directing micro-architectural memory region accesses has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus comprising:
computer hardware to determine whether a polygon within a bounding box of a three-dimensional (3D) graphics scene to be rendered intersects with a three dimensional frustum bounded by entry and exit points of at least four rays passing through the bounding box, wherein the determination is to at least partially control the number of tested ray-polygon combinations to those fully within both of said frustum and said bounding box.

2. The apparatus of claim 1, wherein the polygon is to be ignored for the plurality of rays, in response to the logic determining that the polygon does not intersect the frustum.

3. The apparatus of claim 1, wherein the acceleration structure contains nodes bounded by 3D boxes which are used together with a plurality of rays to form the said frustum.

4. The apparatus of claim 2, wherein the logic is to implement a clipping function to determine whether the polygon intersects the frustum.

5. The apparatus of claim 4, wherein the clipping function includes performing a single-instruction-multiple-data (SIMD) operation on information corresponding to the plurality of rays.

6. The apparatus of claim 5, wherein the SIMD operation includes at least one of a group of SIMD operations consisting of: a packed multiply-add instruction, a packed multiply instruction and a packed addition instruction.

7. The apparatus of claim 1, wherein the logic includes a 3D graphics acceleration integrated circuit.

8. The apparatus of claim 7, wherein the 3D graphics acceleration integrated circuit includes logic for accelerating a ray tracing algorithm.

9. A method comprising:
in a computer processor, choosing a group of at least four rays which are used for rendering of a three dimensional (3D) graphics object;
in a computer processor, building an acceleration structure for this object, comprised of plurality of bounding boxes;
in a computer processor, determining intersection points of the rays with near and far planes of a bounding box of an acceleration structure;
in a computer processor, forming a three dimensional frustum which contains intersections of plurality of rays with a bounding box;
in a computer processor, determining whether any of a polygon's vertices lays outside planes of a frustum whose boundaries are defined by the rays;
in a computer processor, excluding from further processing polygons which are not intersecting the frustum.

10. The method of claim 9, wherein determining whether any of a polygon's vertices lays outside any of four frustum planes includes computing 4-wide SIMD expression, which is proportional to the distances to the four frustum planes.

11. The method of claim 10, wherein the signs of the computed SIMD expressions for all polygon vertices are used to find out if all vertices are outside at least one frustum plane.

12. The method of claim 9 wherein two additional frustum planes are formed by near and far planes orthogonal to the prevalent direction of rays inside the packet.

13. The method of claim 9 wherein further tests are performed inside polygon plane to determine if the frustum is separated from the polygon by at least one polygon edge.

14. The method of claim 10, further comprising performing single-instruction-multiple data (SIMD) operations to determine the separation of the frustum with the polygon.

15. The method of claim 13, wherein the SIMD operation includes at least one of a group of SIMD operations consisting of: a packed multiply-add instruction, a packed multiply instruction and a packed addition instruction.

16. The method of claim 9, further comprising performing a ray tracing algorithm wherein plurality of ray-triangle intersection tests are excluded from further processing.

17. The method of claim 16, further comprising rendering a 3D object.

18. A system comprising:
a memory to store textures for a three dimensional (3D) graphics object;
a graphics device to apply the textures to the 3D graphics object, the graphics device including culling logic to cull a plurality of triangles from a bounding box that do not intersect a three dimensional frustum within the bounding box, said frustum defined by at least four rays passing through said bounding box, before applying the textures to a plurality of triangles that intersect with frustum;
a display controller to project the object onto a display device.

19. The system of claim 18, wherein the memory is to store an acceleration structure including at least one node corresponding to the bounding box.

20. The system of claim 18, wherein the acceleration structure includes a plurality of nodes corresponding to a plurality of bounding boxes corresponding to the 3D graphics object.

21. The system of claim 18, wherein the amount of computations during traversing of the acceleration structure is controlled, at least in part, by the culling logic.

22. The system of claim 21, further comprising at least one processor core which is capable of executing culling instructions.

* * * * *